US012307403B2

United States Patent
Lee et al.

(10) Patent No.: US 12,307,403 B2
(45) Date of Patent: May 20, 2025

(54) ANONYMOUS EMPLOYEE ENGAGEMENT SYSTEM

(71) Applicant: Degree, Inc, San Francisco, CA (US)

(72) Inventors: Jenna Lee, San Francisco, CA (US); Sara Garcia Cabaral, San Francisco, CA (US); Natalia Hess, San Francisco, CA (US); Yeon Ju Kim, Belmont, CA (US); Megan McGowan, San Francisco, CA (US); Michael John Neth, Wichita, KS (US); Matthew Michael Parides, San Francisco, CA (US); Matthew Sacks, Portland, OR (US); Robert Stolarz, San Francisco, CA (US)

(73) Assignee: Degree, Inc, San Francisco, CA (US)

( * ) Notice: Subject to any disclaimer, the term of this patent is extended or adjusted under 35 U.S.C. 154(b) by 447 days.

(21) Appl. No.: 17/657,341

(22) Filed: Mar. 30, 2022

(65) Prior Publication Data

US 2023/0316185 A1   Oct. 5, 2023

(51) Int. Cl.
  *G06Q 10/0639*   (2023.01)
  *G06F 3/0482*   (2013.01)
  *G06Q 10/105*   (2023.01)

(52) U.S. Cl.
  CPC ....... *G06Q 10/0639* (2013.01); *G06F 3/0482* (2013.01); *G06Q 10/105* (2013.01)

(58) Field of Classification Search
  CPC . G06Q 10/105; G06Q 10/06398; G06Q 10/10
  See application file for complete search history.

(56) References Cited

U.S. PATENT DOCUMENTS

| 10,692,027 | B2* | 6/2020 | Joi | G06Q 10/06312 |
|---|---|---|---|---|
| 2011/0010425 | A1* | 1/2011 | Bernatz | H04L 51/48 |
| | | | | 709/206 |
| 2011/0217686 | A1* | 9/2011 | Bernatz | G09B 5/00 |
| | | | | 434/350 |
| 2014/0289160 | A1* | 9/2014 | Stovall | G06Q 30/0282 |
| | | | | 705/347 |
| 2015/0304300 | A1* | 10/2015 | Bender | H04L 51/214 |
| | | | | 726/4 |
| 2017/0169390 | A1* | 6/2017 | Wesselink | H04L 51/216 |
| 2018/0082238 | A1* | 3/2018 | Shani | G06Q 10/06398 |
| 2020/0242138 | A1* | 7/2020 | Russ | G06F 16/2455 |
| 2020/0265365 | A1* | 8/2020 | Kim | G06Q 10/10 |
| 2022/0237390 | A1* | 7/2022 | Ridgill, II | G06F 21/6254 |

* cited by examiner

*Primary Examiner* — Johnna R Loftis
(74) *Attorney, Agent, or Firm* — Schwegman Lundberg & Woessner, P.A.

(57) ABSTRACT

A method of collecting anonymous feedback is disclosed. An anonymous input toggle is associated with one or more input mechanisms. Based on the anonymous input toggle being turned on, it is detected that the user has submitted anonymous feedback data with respect to the one or more input mechanisms. The anonymous feedback data is stored in a database such that identifying information about the user is inaccessible to one or more other users. One or more specialized user interfaces are provided to the one or more other users for submitting a reply to the anonymous feedback. The one or more specialized user interfaces are configured to not present the identifying information. The user is notified, via one or more additional specialized user interfaces, of the submitting of the reply to the anonymous feedback.

20 Claims, 12 Drawing Sheets

Comment replies 

Allows survey admins to reply to anonymous comments in this survey. The commenter's identity will remain anonymous, are notified through email, and are able to continue the conversation.

☐ Allow Managers to reply to anonymous comments from their direct reports

☐ Allow Mangers of Managers to see the replies for their indirect reports

*FIG. 3A*

Comment replies 

Allows survey admins to reply to anonymous comments in this survey. The commenter's identity will remain anonymous, are notified through email, and are able to continue the conversation.

☑ Allow Managers to reply to anonymous comments from their direct reports

☑ Allow Mangers of Managers to see the replies for their indirect reports

*FIG. 3B*

Comment replies 

Allows survey admins to reply to anonymous comments in this survey. The commenter's identity will remain anonymous, are notified through email, and are able to continue the conversation.

☑ Allow Managers to reply to anonymous comments from their direct reports

☐ Allow Mangers of Managers to see the replies for their indirect reports

*FIG. 3C*

Comment replies 

Allows survey admins to reply to anonymous comments in this survey. The commenter's identity will remain anonymous, are notified through email, and are able to continue the conversation.

☐ Allow Managers to reply to anonymous comments from their direct reports

☑ Allow Mangers of Managers to see the replies for their indirect reports

Your comment

Comment from  Anonymous

I feel like sometimes the questions for the All Hands AMA are screened. I submit questions every almost every week, but none are ever answered.

Question: What do you wish senior management knew about your experience at work?                                    Strongly Disagree

Replies

Jonathan Castro  Oct 27, 2020

The People team will be rolling out new AMA software at the next All Hands. This software holds us accountable to answer any questions that we don't get to asynchronously after the meeting. We hope this will improve your experience!

Anonymous

Lorem ipsum dolor sit amet, consectetur adipiscing elit, sed do eiusmod tempor incididunt ut labore et dolore magna aliqua. Ut enim ad minim veniam.

Your identity will remain anonymous when you respond.    Cancel    [Reply Anonymously]

*FIG. 8*

FIG. 10

ANONYMOUS EMPLOYEE ENGAGEMENT SYSTEM

TECHNICAL FIELD

The present application relates generally to the technical field of end user computer security and, in one specific example, to facilitating anonymous sending, receiving, posting, and/or management of messages by a user affiliated with an entity on an electronic communication system provided or managed by the entity.

BACKGROUND

An entity, such as a private or public corporation, may benefit from a better understanding of how individuals associated with the entity, such as employees of the entity (and/or other parties, such as contractors or third-party service providers associated with the entity), feel about the entity itself or one or more particular practices of the entity.

For example, the entity may seek to improve its understanding of user sentiments such that the entity can adapt its practices or policies to improve its levels of success with respect to various metrics, such as employee satisfaction, efficiency, and/or retention, that are deemed important by stakeholders of the entity.

To improve its understanding, the entity may seek to actively engage such individuals by, for example, encouraging participation in online surveys and/or other online electronic communication systems provided or managed by the entity.

However, because of various technological limitations of these systems, such as an inability of these systems to provide sufficient security, such as a means to protect the anonymity of the individuals from which the entity seeks information, these systems fall short of their full potential.

BRIEF DESCRIPTION OF THE DRAWINGS

Some embodiments are illustrated by way of example and not limitation in the figures of the accompanying drawings.

FIGS. 3A-3D illustrate an example 'Comment replies' setting that may be provided in the one or more specialized user interfaces (e.g., for access by an administrator).

FIGS. 4 and 5 illustrate various differences between example 'status view' configuration and example 'full comment thread' configuration of the one or more specialized user interfaces.

FIGS. 8-10 depict screenshots of one or more example specialized user interfaces for submitting anonymous comment replies.

DETAILED DESCRIPTION

Figure 1:
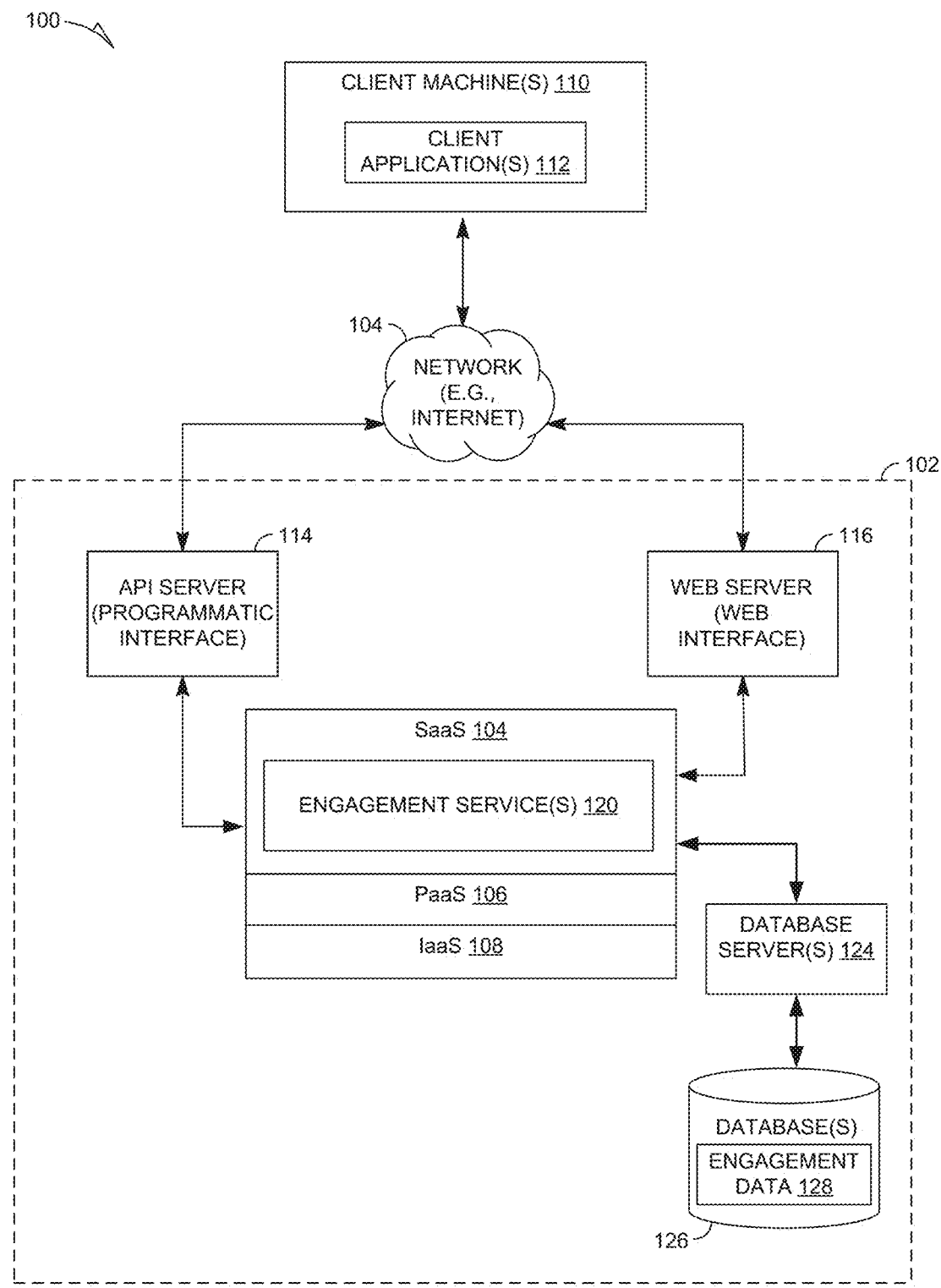
FIG. 1 is a network diagram depicting a cloud-based SaaS system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

Acting on feedback or sentiment of employees and/or other selected individuals or groups of individuals, such as third-party service providers, may be one of the reasons an entity solicits relevant input, such as by running an engagement survey.

But there may be some technical problems associated with collecting accurate inputs. For example, while survey anonymity may facilitate more open and honest feedback, it may make it hard for leaders, managers, and HR teams to respond to employee comments individually. Without the technological improvements described herein, closing the loop on important individual issues or acknowledging a great piece of feedback may not be feasible without issuing broad statements or breaching employee trust.

An anonymous employee engagement system, including support for anonymous comment replies, is described herein. The system provides technological improvements for closing the loop on employee feedback. When there's feedback that needs to be responded to on an individual basis, selected individuals can reply with an acknowledgement or follow-up information. Users, such as employees or others, are notified and have opportunities to continue the conversation in the system while remaining anonymous.

Individuals tasked with responding to anonymous feedback can collaborate with company leaders to craft the best response possible. For example, managers or HR teams alike can identify comments that need to be addressed, assign them for a response from the most relevant person, or ask for help when needed so replies are authentic and thoughtful.

Employees can add more context and let responsible parties know when their issue is addressed, all while staying anonymous. The promise of anonymity may be an important one. For example, it may be important for employees to feel like they can be honest throughout the process of giving feedback to their company leaders—being able to create a two-way dialogue while preserving that anonymity provides value to both employees and leaders (e.g., by improving the accuracy of assessments of user sentiment toward the entity or one or more practices of the entity).

Anonymous Engagement surveys and/or other methods of gathering input may give entities, such as companies, the power to both celebrate where their culture thrives and confront uncomfortable issues inside their organization. Employees gain confidence knowing they can be honest, and leaders can truly hold a mirror up to themselves and their business to, for example, see the realities of their culture and work-life.

The features described herein may work with various methods of collecting input, including engagement surveys, so that responsible parties can close the loop continuously on employee feedback.

When an admin or manager replies to a user's anonymous feedback, they should treat their response with care, as if they're speaking with that employee in-person, especially given that the user (e.g., an employee) went out of their way to provide this anonymous feedback and put themselves out there. After a reply is posted, the user may be notified with a message that contains a snippet of the reply. So, in example embodiments, it's possible for the user to see at least some of the detail of that reply already in their email. A 'delete' functionality may be used in case there was an inappropriate reply or private note that was sent to the user. In example embodiments, the delete functionality is only accessible (e.g., via an internal tool) to users having a particular role, such as a customer support role. This will disable admin/manager/employee to see that particular deleted reply or private note in one or more specialized user interfaces going forward.

A method of collecting anonymous feedback data is disclosed. An anonymous feedback reply toggle is associated with one or more input mechanisms. In example embodiments, the anonymous feedback reply toggle controls whether particular users, such as users having particular roles (e.g., an admin, manager, and/or MOM role), can reply to anonymous feedback submitted by a user with respect to the one or more input mechanisms. In example embodiments, a separate control (e.g., an anonymous input toggle) is provided to allow anonymous feedback to be submitted by one or more users in the first place with respect to the one or more input mechanisms, such for a particular question in a survey or a particular topic posted publicly (e.g., on an online message board). Based on the anonymous feedback reply toggle and/or anonymous input toggle being turned on, it is detected that the user has submitted the anonymous feedback with respect to the one or more input mechanisms. The anonymous feedback is stored in a database such that identifying information about the user is inaccessible to one or more other users. One or more specialized user interfaces are provided to the one or more other users for submitting a reply to the anonymous feedback. The one or more specialized user interfaces are configured to not present the identifying information. The user is notified, via one or more additional specialized user interfaces, of the submitting of the reply to the anonymous feedback by the one or more other users.

FIG. 1 is a network diagram depicting a system 100 within which various example embodiments may be deployed. A networked system 102, in the example form of a cloud computing service, such as Microsoft Azure or other cloud service, provides server-side functionality, via a network 104 (e.g., the Internet or Wide Area Network (WAN)) to one or more endpoints (e.g., client machines 110). FIG. 1 illustrates client application(s) 112 on the client machines 110. Examples of client application(s) 112 may include a web browser application, such as the Internet Explorer browser developed by Microsoft Corporation of Redmond, Washington or other applications supported by an operating system of the device, such as applications supported by Windows, iOS or Android operating systems. Examples of such applications include e-mail client applications executing natively on the device, such as an Apple Mail client application executing on an iOS device, a Microsoft Outlook client application executing on a Microsoft Windows device, or a Gmail client application executing on an Android device. Examples of other such applications may include calendar applications and file sharing applications. Each of the client application(s) 112 may include a software application module (e.g., a plug-in, add-in, or macro) that adds a specific service or feature to the application.

An API server 114 and a web server 116 are coupled to, and provide programmatic and web interfaces respectively to, one or more software services, which may be hosted on a software-as-a-service (SaaS) layer or platform 104. The SaaS platform may be part of a service-oriented architecture, being stacked upon a platform-as-a-service (PaaS) layer 106 which, may be, in turn, stacked upon a infrastructure-as-a-service (IaaS) layer 108 (e.g., in accordance with standards defined by the National Institute of Standards and Technology (NIST)).

While the applications (e.g., engagement service(s)) 120 are shown in FIG. 1 to form part of the networked system 102, in alternative embodiments, the applications 120 may form part of a service that is separate and distinct from the networked system 102.

Further, while the system 100 shown in FIG. 1 employs a cloud-based architecture, various embodiments are, of course, not limited to such an architecture, and could equally well find application in a client-server, distributed, or peer-to-peer system, for example. The various server applications 120 could also be implemented as standalone software programs. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various applications 120 via the web interface supported by the web server 116. Similarly, native applications executing on the client machine(s) 110 may accesses the various services and functions provided by the applications 120 via the programmatic interface provided by the API server 114. For example, the third-party applications may, utilizing information retrieved from the networked system 102, support one or more features or functions on a website hosted by the third party. The third-party website may, for example, provide one or more promotional, marketplace or payment functions that are integrated into or supported by relevant applications of the networked system 102.

The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 and so as to allow the server applications 120 to share and access common data. The server applications 120 may furthermore access one or more databases 126 via the database servers 124. In example embodiments, various data items are stored in the database(s) 126, such as engagement data 128. In example embodiments, the engagement data includes one or more anonymous comment replies and associated metadata, as described herein.

Navigation of the networked system 102 may be facilitated by one or more navigation applications. For example, a search application (as an example of a navigation application) may enable keyword searches of data items included in the one or more database(s) 126 associated with the networked system 102. Various other navigation applications may be provided to supplement the search and browsing applications.

Figure 2:
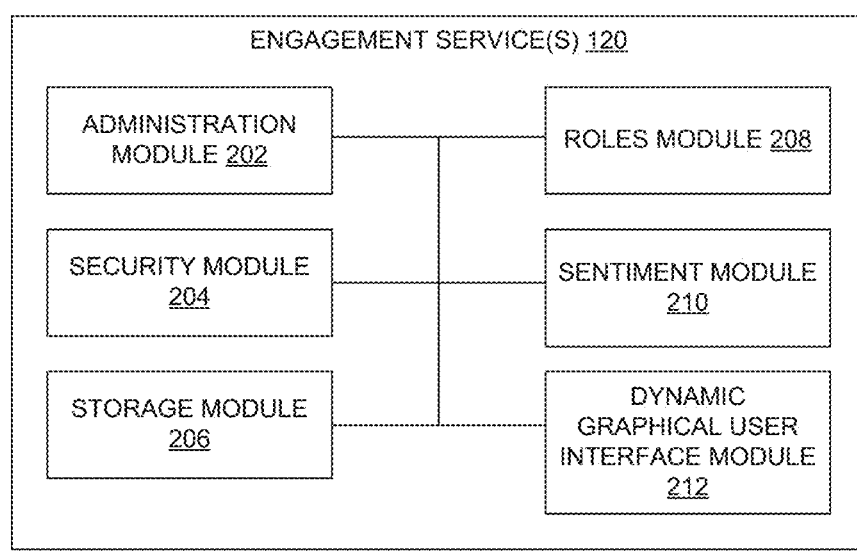
FIG. 2 is a block diagram illustrating example modules of the engagement service(s) of FIG. 1.

FIG. 2 is a block diagram illustrating example modules of the engagement service(s) 120. An administration module 202 is configured to enable administration of anonymous employee engagement system (e.g., via one or more specialized user interfaces), as described in more detail herein.

A security module 204 is configured to implement security measures associated with collecting anonymous feedback data, including protecting the anonymity of users, as described in more detail herein. A storage module 206 is configured to store the anonymous feedback data in a secure fashion, as described in more detail herein. A roles module 208 is configured to manage roles for users for purposes of controlling access and/or managing replies to the anonymous feedback data. A sentiment module 210 is configured to provide a sentiment of users with respect to an entity or one or more business practices of the entity based at least in part on the anonymous feedback data. A dynamic graphical user interface (GUI) module 212 is configured to provide one or more specialized graphical user interfaces, as described herein, to, for example, allow users to submit anonymous feedback data and/or to allow one or more authorized users, such as administrators, managers, or managers of managers (MOMs) to reply to anonymous feedback data. In example embodiments, the one or more specialized user interfaces or elements included in the one or more specialized user interfaces, or combinations thereof, are asserted to be unconventional. Additionally, the one or more specialized user interfaces described include one or more features that specially adapt the one or more specialized user interfaces for devices with small screens, such as mobile phones or other mobile devices.

FIGS. 3A-3C illustrate an example 'Comment replies' setting that may be provided in the one or more specialized user interfaces (e.g., for access by an administrator). In example embodiments, the setting may be a toggle switch that is provided per input mechanism, such as per online survey or per online public message thread (or per item included in each input mechanism), to allow anonymous feedback to be enabled or disabled for the corresponding input mechanism or input item. In example embodiments, the toggle may be turned on for past input mechanisms or input items. In example embodiments, for past input mechanisms or input items, the turning on of the toggle may be based on a determination of whether it would be appropriate at the current time to accept anonymous feedback with respect to a topic associated with the input mechanism or input item. In example embodiments, the determination may be based on one or more policies of the entity, such as whether a time period (e.g., as a number of weeks) since the input mechanism was initiated has transgressed a configurable time period threshold or whether a relevancy score associated with the input mechanism or input item has transgressed a configurable relevancy threshold. In example embodiments, the configurable thresholds are configurable by an admin via the one or more specialized user interfaces, such as a specialized administration user interface. In example embodiments, the toggle and/or its associated options may be condensed into a smaller graphical representation, such as an icon, to make the toggle and/or its associated options fit more easily on a small screen.

In example embodiments, the toggle may optionally be turned off after it has been on. In this case, if there were already replies sent (by admins, managers, and/or MOMs), they may be hidden from the UI for admins and managers. However, in some embodiments, participants may have already received these notifications at the time of those replies being sent and those 'can't be taken back'. Within this toggle, there may be multiple layers (e.g., up to four layers) of flexibility, as described herein.

Example Layer 1 (see FIG. 3A): "Admins only" setting. This setting may be used by entities that only want Admins to reply. In example embodiments, even if MOMs won't be able to reply, they'll be able to see a 'status view'. In example embodiments, the status view shows that some conversation is happening, and which admin is assigned, but only admins can view and/or reply to every comment.

Example Layer 2 (see FIG. 3B): "All settings on" setting. This setting may be used by entities that are comfortable having all replies and private notes visible across admins, managers, and MOMs. For example, a more 'transparent' organization may be comfortable having these replies be more visible. In example embodiments, admins can reply to every comment and/or see full comment threads. In example embodiments, managers can reply to comments from their direct reports and/or see full comment threads. In example embodiments, MOMs can see the full comment threads and/or view replies made for their indirect reports, but they cannot reply directly to the comment (workaround if needed: they can be added as a survey admin).

Example Layer 3 (see FIG. 3C). "Admin and Manager only" setting. This setting may be used by entities that want to allow admins and managers to reply directly, but don't want MoMs to see the detailed conversations happening. In example embodiments, admins can reply to every comment and/or see full comment threads. In example embodiments, managers can reply to comments from their direct reports and/or see the full comment thread. In example embodiments, MoMs see a 'status view'.

Example Layer 4 (see FIG. 3D): "Admin and MoM only" setting. This setting may be used by entities that want to allow admins to reply, but want to give visibility to MoMs on the detailed conversations happening. In example embodiments, admins can reply to every comment and/or see the full comment thread. In example embodiments, managers see a 'status view'. In example embodiments, MoMs see the full comment thread.

Figure 4:
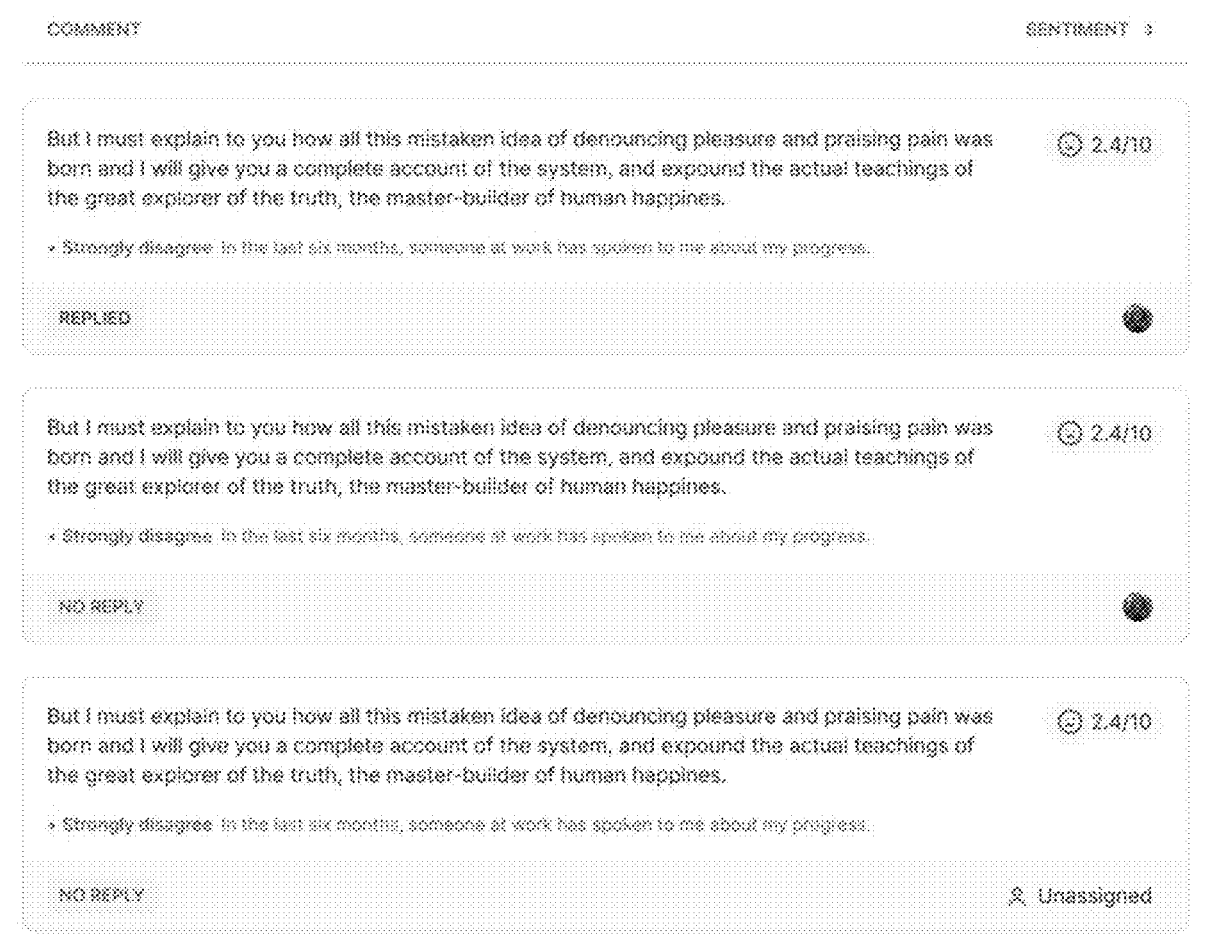
Figure 5:

FIGS. 4 and 5 illustrate various differences between an example 'status view' (see FIG. 4) and a 'full comment thread' (see FIG. 5). In example embodiments, the 'status view' is provided to some users in order to give some status, such that comments are being addressed, without sharing the entire comment thread to the user. In the 'status view', user can see (1) status like 'replied' and/or (2) assigned user on the comment.

Figure 6:
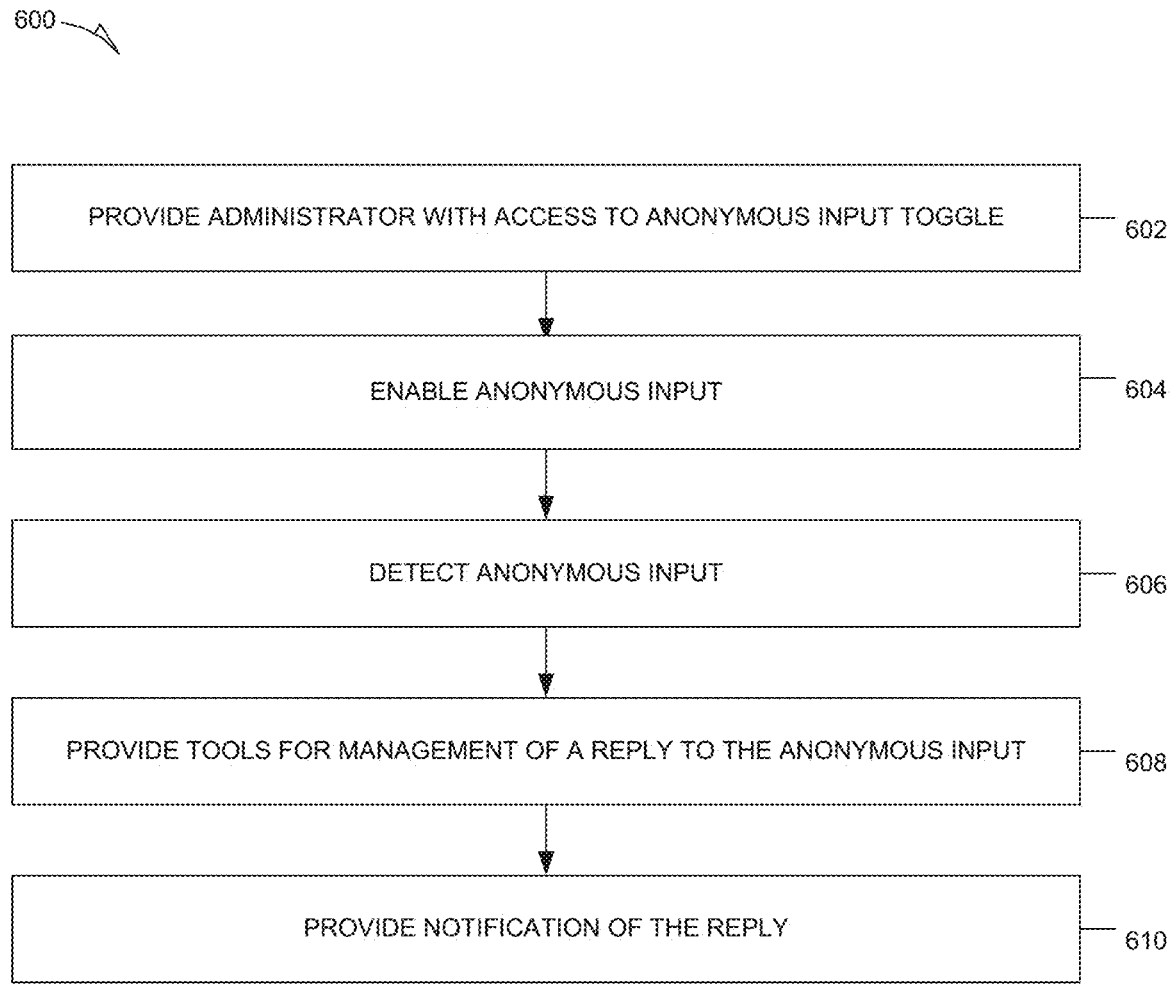
FIG. 6 is a flowchart illustrating example operations of a method of enabling collection of anonymous feedback data from one or more users.

FIG. 6 is a flowchart illustrating example operations of a method 600 of enabling collection of anonymous feedback data from one or more users. In example embodiments, the method 600 is performed by one or more of the modules of FIG. 2.

At operation 602, an administrator associated with an entity is provided with access to anonymous input toggle and/or an anonymous feedback reply toggle (see, e.g., FIGS. 3A-3D). In example embodiments, the anonymous input toggle and/or anonymous feedback reply toggle is associated with one or more input mechanisms, such as an online survey, an online public forum or message board, and so on, and/or a particular input item accessible via the input mechanisms, such as a question in an online survey or a posting on an online forum. In example embodiments, the anonymous input toggle and/or anonymous feedback reply toggle is configured to be associated with a particular question of the online survey or a particular posting or thread in the online public forum. In example embodiments, an administrator (e.g., a user assigned to an appropriate administrative role) is provided with a user interface for associating (e.g., visually) the anonymous input toggle and/or the anonymous feedback reply toggle with the input mechanism and/or input item. In example embodiments, the user interface is configured to surface one or more input mechanisms and/or input items that are discovered from one or more databases (e.g., the databases 126) storing data for input mechanisms and/or input items published by or managed by the entity for various users (e.g., employees of the entity).

At operation 604, anonymous input is enabled or disabled for each associated input mechanism or input item. For example, based on a selection (e.g., via a user interface element in an administrative user interface) of the anonymous input toggle associated with an input mechanism (e.g., by an administrator), anonymous input and/or replies to the anonymous input may be toggled on or off for the input mechanism and/or input item.

At operation 606, anonymous input is detected. For example, it is determined that, for one of the input mechanisms or input items for which anonymous input has been enabled, a user has chosen to submit anonymous feedback data. For example, the user may submit anonymous feedback data using a specialized user interface such as one or more of the specialized user interfaces depicted in FIGS. 8-10.

At operation 608, tools are provided for managing a reply to the anonymous feedback data. For example, depending on a layer associated with the toggle associated with the input mechanism or input item, different tools may be provided to one or more users based on their role (e.g., administrator, manager, or MOM) (see, e.g., the layers depicted in FIGS. 3A-3D). One or more users, based on their roles, may be assigned tasks of drafting a reply/response, reassigning the response to another user for purposes of drafting the response, reviewing the response, and so on. In example embodiments, one or more users, based on their roles, may be given only a limited view of the process for managing a reply to the response, such as a status view, which may hide the actual content of the anonymous feedback and/or the response, but provide metadata, such as a status of the response or information about where in the feedback loop the thread is (e.g., feedback submitted, assigned, reassigned, reply sent, feedback loop closed, and so on). In example embodiments, the tools may include one or more user specialized interfaces or elements included in the one or more specialized user interfaces that are adapted for small screens. For example, the user interface elements for invoking functionality of the tools may be represented in a condensed graphical form.

At operation 610, upon submission of a reply to the anonymous feedback, the user who provided the anonymous feedback may be notified of the reply. In example embodiments, the user may be provided with one or more additional specialized user interfaces for submitting additional anonymous feedback (e.g., as part of a conversation with the user who submitted the reply) and/or closing the feedback loop. These one or more additional specialized user interfaces may also be adapted for small screens, such that, for example, the user interface elements for closing or continuing the feedback loop may be represented in a condensed graphical form.

Figure 7:
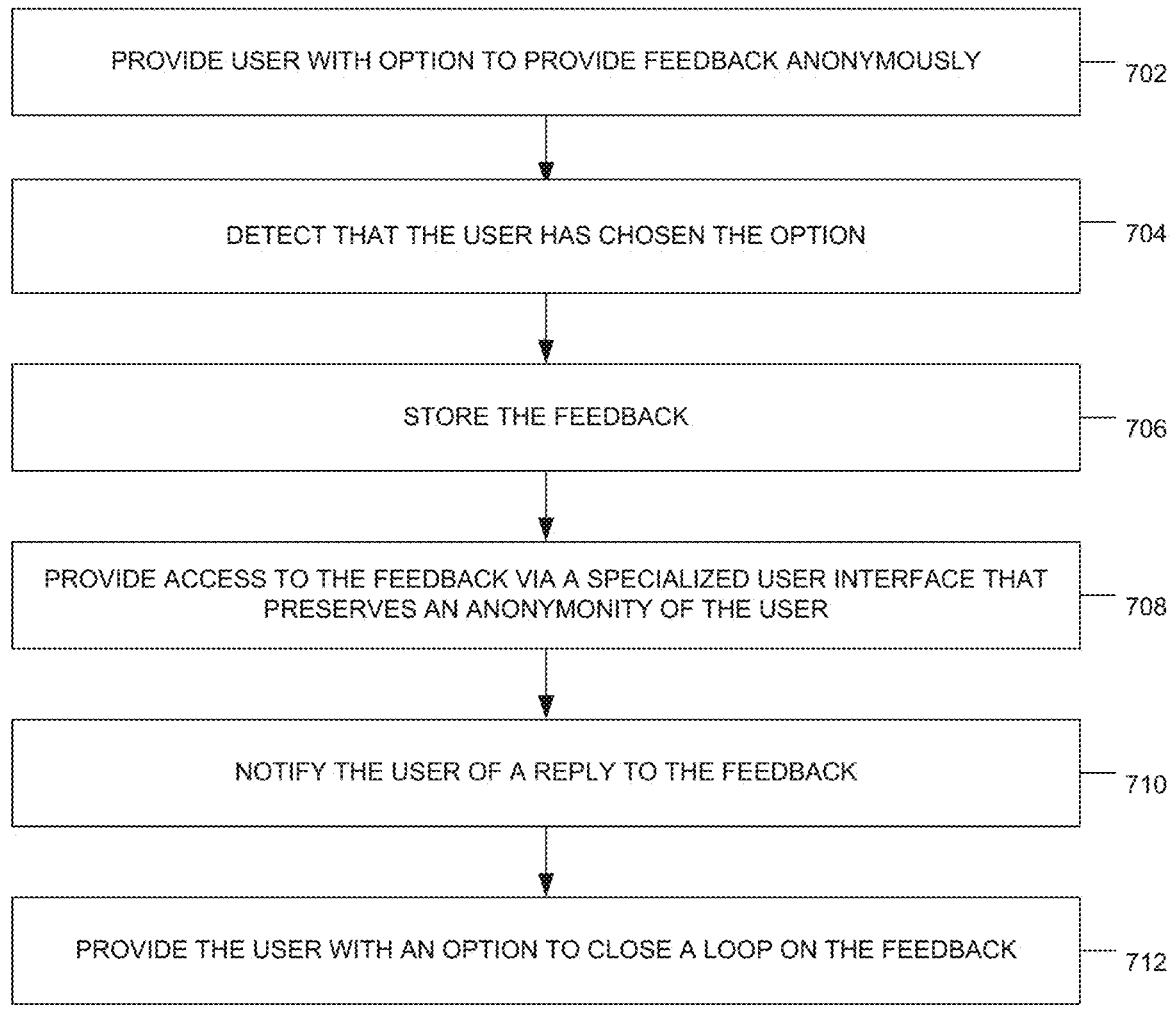
FIG. 7 is a flowchart illustrating example operations of a method of providing anonymous feedback data.

FIG. 7 is a flowchart illustrating example operations of a method 700 of providing anonymous feedback data. In example embodiments, the method 700 is performed by one or more of the modules of FIG. 2.

At operation 702, a user, such as an employee, is provided with an option to provide anonymous feedback. In example embodiments, the option is provided based on an enabling of an anonymous input toggle associated with a topic of interest to an entity, such as an answer to an online survey question or a response to a thread on an online message forum. In example embodiments, the user is provided with a user interface for submitting the anonymous feedback data, such as one or more of the user interfaces depicted in FIGS. 8-10.

At operation 704, it is determined that the user has chosen to accept the option to provide anonymous feedback data. For example, the user may enter feedback data into one or more fields presented via a user interface and choose a user interface element of the user interface to indicate that the feedback is to be submitted anonymously.

At operation 706, the feedback data is stored in a database in a secure (e.g., encrypted) fashion. In example embodiments, the feedback data may be submitted as one or more database records. In example embodiments, the feedback data may be associated with one or more metadata items. In example embodiments, the one or more metadata items may include a field indicating whether the feedback contained in the record was submitted anonymously. In example embodiments, the one or more metadata items may include an identifier for associating the record with the user who submitted the record. In example embodiments, based on a determination that the record was submitted anonymously (e.g., based on the one or more metadata items), the identifier of the user who submitted the record is encrypted or otherwise hidden such that the user who submitted the record cannot be personally identified from the database record. In example embodiments, the identifier may only be unencrypted and interpreted by the engagement services for routing of replies to the anonymous feedback data to the user who submitted the anonymous feedback data, but never accessible by users of the system.

At operation 708, access to the feedback data is provided via one of the specialized user interfaces to one or more additional users, such as admins, managers, or MOMs (e.g., based on roles of the users), as described herein. Identifying information about the user who submitted the anonymous feedback data is not presented to the additional users.

At operation 710, the user who submitted the feedback is notified of a reply to the feedback. In example embodiments, the reply to the feedback data may be initiated or managed by an admin, manager, or MOM, as described in FIG. 6.

At operation 712, the user who submitted the feedback is provided with a specialized user interface for continuing a conversation pertaining to the feedback data (e.g., by submitting additional anonymous feedback data) and/or choosing to close the feedback loop (e.g., by indicating that the user does not wish to provide additional anonymous feedback data). In example embodiments, a closing of the feedback loop by the user may prevent other users, such as admins, managers, or MOMs from providing any additional replies to the anonymous feedback. If the user chooses to provide additional anonymous feedback, the feedback loop may be kept open. In this case, the other users may be notified of the additional submission and may manage replies to the additional submission (e.g., as discussed above with respect to FIG. 6). This process may continue indefinitely or until the feedback loop is closed either by the user providing the anonymous feedback or by users responsible for responding to the anonymous feedback (e.g., by selection of corresponding user interface elements included in one or more specialized user interfaces).

Figure 9:
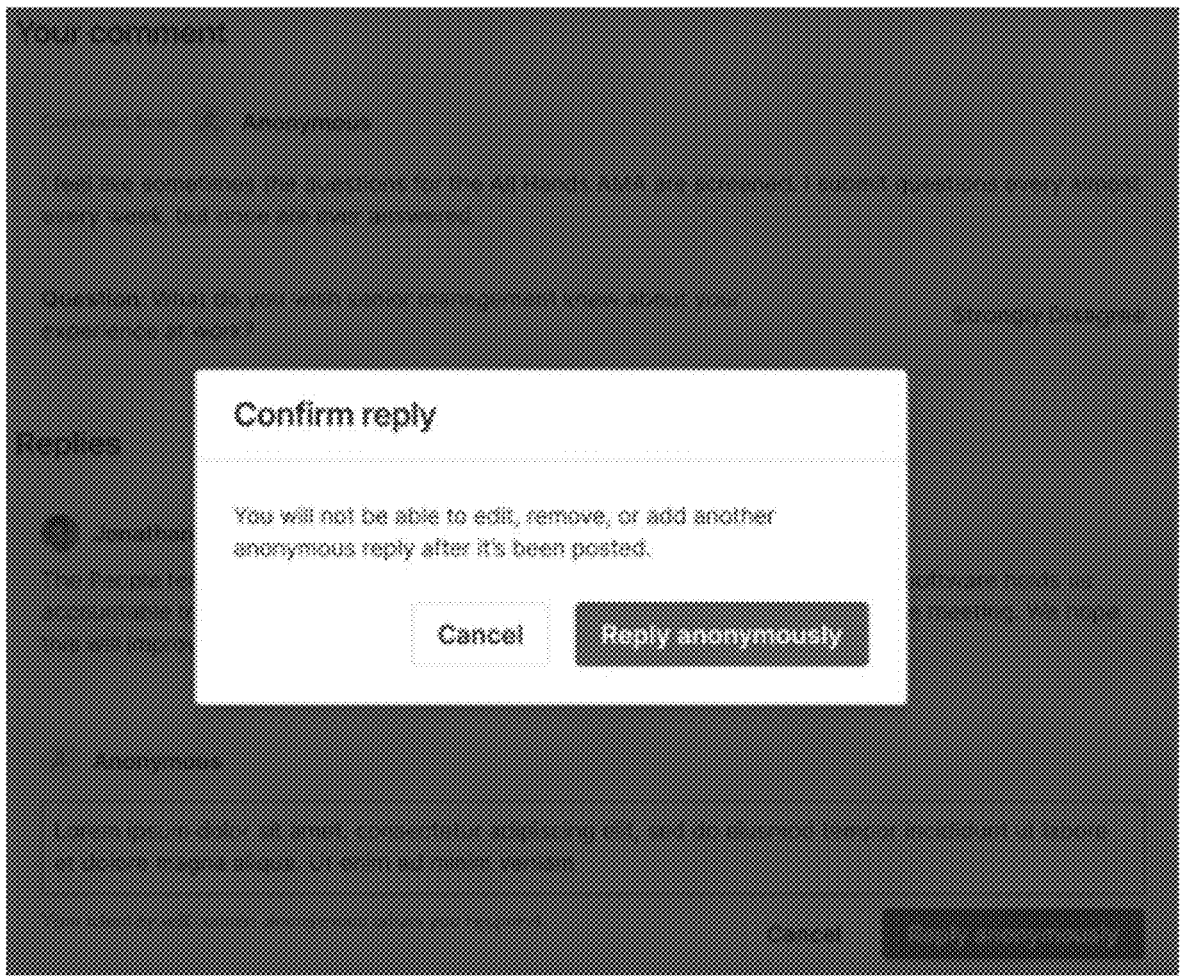

FIGS. 8-10 depict screenshots of one or more example specialized user interfaces for submitting anonymous comment replies. As depicted in FIG. 8, the feedback data (e.g., lorem ipsum dolor . . . ") may be entered into a reply field of the user interface, wherein the reply corresponds to an input mechanism (here, an answer to a survey question). The user may then click a user interface element (e.g., a "Reply anonymously" button) to indicate that the feedback data is to be submitted anonymously. In example embodiments, the profile of an anonymous user is depicted in the user interface to indicate how the user's reply will be displayed to other users.

As shown in FIG. 9, the user may (optionally) be prompted to confirm that the user wishes to submit the feedback data anonymously.

As shown in FIG. 10, upon submission of the anonymous feedback data, the anonymous feedback is sent or posted (e.g., via a public posting and/or a message consumption by other users, such as admins, managers, or managers of managers). In example embodiments, the user is notified that the anonymous feedback data has been submitted. In example embodiments, the user may be provided with an option to mark the conversation as complete, thus closing the feedback loop (e.g., by clicking a "Mark conversation complete" link).

Example Mobile Device

Figure 11:
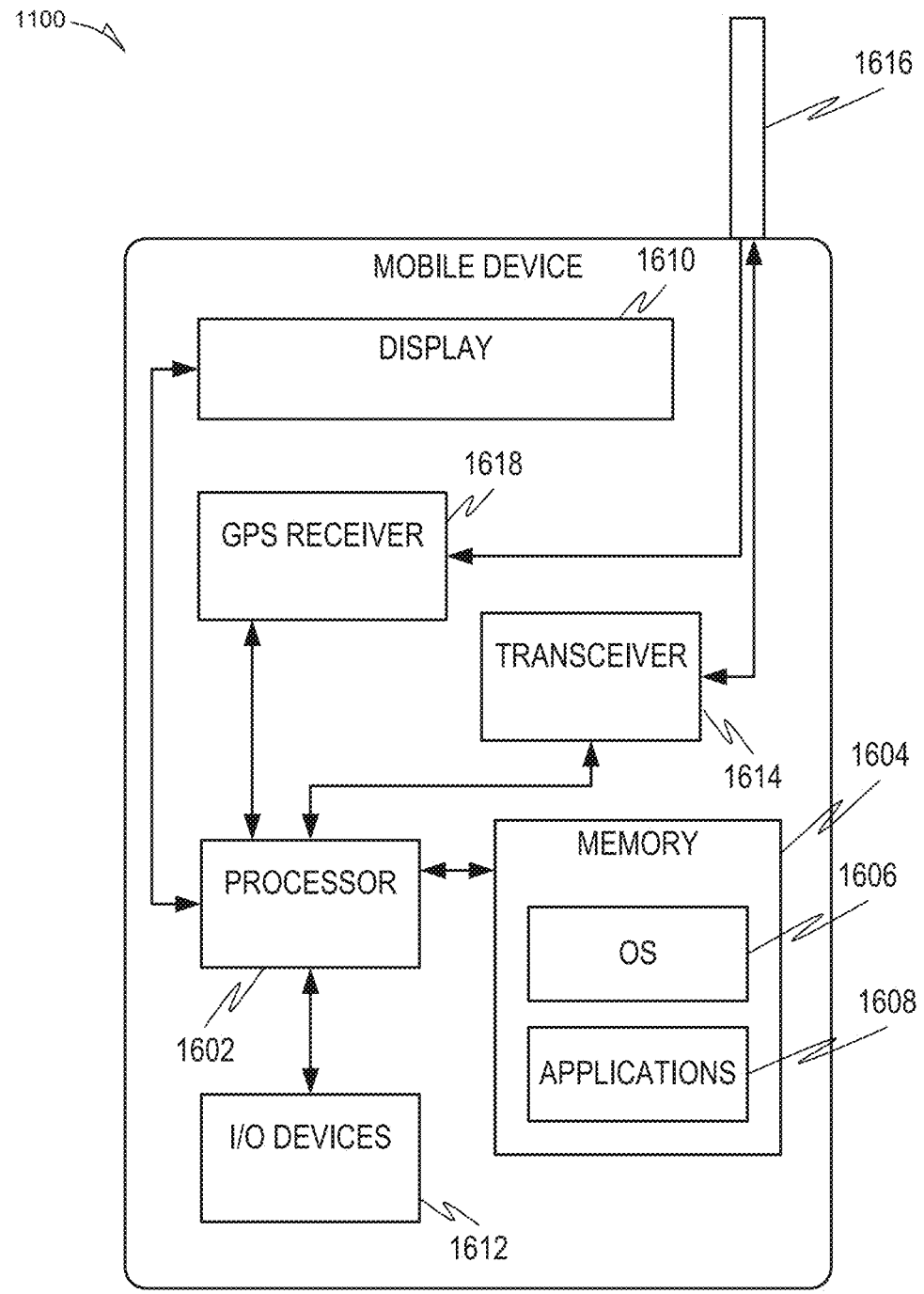
FIG. 11 is a block diagram illustrating a mobile device, according to an example embodiment.

FIG. 11 is a block diagram illustrating a mobile device 1100, according to an example embodiment. The mobile device 1100 can include a processor 1602. The processor 1602 can be any of a variety of different types of commercially available processors suitable for mobile devices 1100 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 1100. Further, in some configurations, a GPS receiver 1618 can also make use of the antenna 1616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
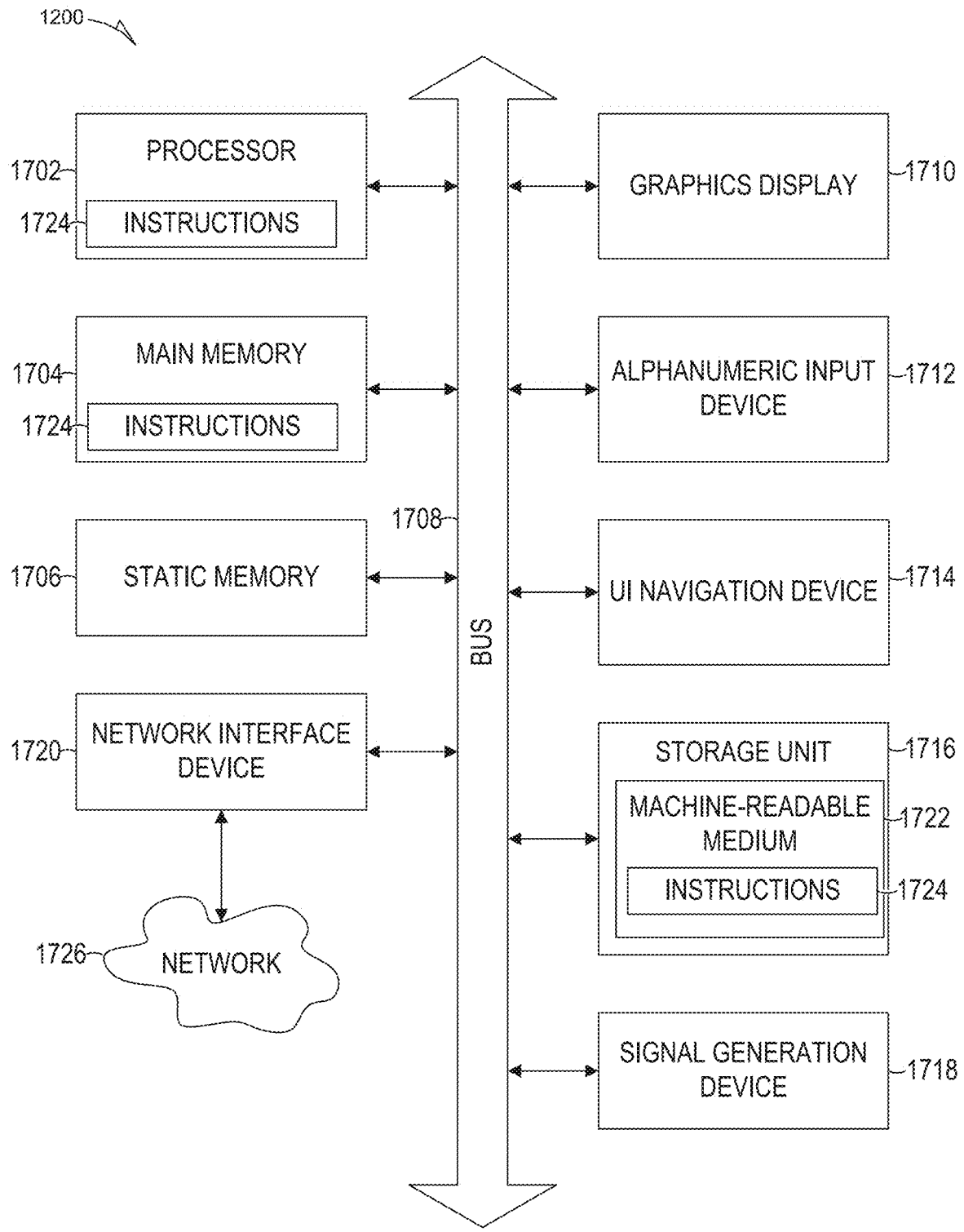
FIG. 12 is a block diagram of a machine in the example form of a computer system within which instructions for causing the machine to perform any one or more of the methodologies discussed herein may be executed.

FIG. 12 is a block diagram of an example computer system 1200 on which methodologies and operations described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1702 (e.g., a central processing unit (CPU), a graphics processing unit (GPU) or both), a main memory 1704 and a static memory 1706, which communicate with each other via a bus 1708. The computer system 1200 may further include a graphics display unit 1710 (e.g., a liquid crystal display (LCD) or a cathode ray tube (CRT)). The computer system 1200 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.

Machine-Readable Medium

The storage unit 1716 includes a machine-readable medium 1722 on which is stored one or more sets of instructions and data structures (e.g., software) 1724 embodying or utilized by any one or more of the methodologies or functions described herein. The instructions 1724 may also reside, completely or at least partially, within the main memory 1704 and/or within the processor 1702 during execution thereof by the computer system 1200, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks, and CD-ROM and DVD-ROM disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more computer processors;
   one or more computer memories;
   a set of instructions incorporated into the one or more computer memories, the set of instructions configuring the one or more computer processors to perform operations comprising:
   associating an anonymous input toggle with one or more input mechanisms, the anonymous input toggle controlling whether anonymous feedback is submittable by a user with respect to the one or more input mechanisms;
   based on the anonymous input toggle being turned on, detecting that the user has submitted the anonymous feedback with respect to the one or more input mechanisms;
   storing the anonymous feedback in a database such that identifying information about the user is accessible for routing a reply to the anonymous feedback to the user but never accessible to one or more other users;
   providing one or more specialized user interfaces to the one or more other users for submitting the reply to the anonymous feedback, the one or more specialized user interfaces including automatically assigning a responsibility for the submitting of the reply to the one or more users based on a role of the one or more users; and
   performing the routing of the reply to the anonymous feedback to the user based on an accessing of the identifying information and notifying the user of the submitting of the reply to the anonymous feedback by the one or more other users for managing via one or more additional specialized user interfaces.

2. The system of claim 1, the operations further comprising determining to continue a conversation between the user and the one or more other users based on a determination that the user has submitted additional anonymous feedback via the one or more additional specialized user interfaces.

3. The system of claim 1, the operations further comprising determining to close a feedback loop associated with the anonymous feedback based on a determination that the user has requested the closing of the feedback loop via the one or more additional specialized user interfaces.

4. The system of claim 1, wherein each of the one or more other users have at least one of an administrator, a manager, or a manager of managers (MOM) role.

5. The system of claim 4, wherein the one or more specialized user interfaces are configured to present the anonymous feedback to each of the one or more users having the administrator role, but keep the anonymous feedback hidden from the one or more users having a manager or MOM role.

6. The system of claim 1, wherein the one or more specialized user interfaces include options for managing a reply to the user.

7. The system of claim 6, wherein the options for managing the reply to the user include automatically assigning a responsibility for the submitting of the reply to one of the other users based on a role of the one of the other users.

8. A method comprising:
   associating an anonymous input toggle with one or more input mechanisms, the anonymous input toggle controlling whether anonymous feedback is submittable by a user with respect to the one or more input mechanisms;
   based on the anonymous input toggle being turned on, detecting that the user has submitted the anonymous feedback with respect to the one or more input mechanisms;
   storing the anonymous feedback in a database such that identifying information about the user is accessible for routing a reply to the anonymous feedback to the user but never accessible to one or more other users;
   providing one or more specialized user interfaces to the one or more other users for submitting the reply to the anonymous feedback, the one or more specialized user interfaces including automatically assigning a responsibility for the submitting of the reply to the one or more users based on a role of the one or more users; and
   performing the routing of the reply to the anonymous feedback to the user based on an accessing of the identifying information and notifying the user of the submitting of the reply to the anonymous feedback by the one or more other users for managing via one or more additional specialized user interfaces.

9. The method of claim 8, further comprising determining to continue a conversation between the user and the one or more other users based on a determination that the user has submitted additional anonymous feedback via the one or more additional specialized user interfaces.

10. The method of claim 8, further comprising determining to close a feedback loop associated with the anonymous feedback based on a determination that the user has requested the closing of the feedback loop via the one or more additional specialized user interfaces.

11. The method of claim 8, wherein each of the one or more other users have at least one of an administrator, a manager, or a manager of managers (MOM) role.

12. The method of claim 11, wherein the one or more specialized user interfaces are configured to present the anonymous feedback to each of the one or more users having the administrator role, but keep the anonymous feedback hidden from the one or more users having a manager or MOM role.

13. The method of claim 8, wherein the one or more specialized user interfaces include options for managing a reply to the user.

14. The method of claim 13, wherein the options for managing the reply to the user include automatically assigning a responsibility for the submitting of the reply to one of the other users based on a role of the one of the other users.

15. A non-transitory computer-readable storage medium storing instructions thereon, which, when executed by one or more processors, cause one or more processors to perform operations, the operations comprising:
- associating an anonymous input toggle with one or more input mechanisms, the anonymous input toggle controlling whether anonymous feedback is submittable by a user with respect to the one or more input mechanisms;
- based on the anonymous input toggle being turned on, detecting that the user has submitted the anonymous feedback with respect to the one or more input mechanisms;
- storing the anonymous feedback in a database such that identifying information about the user is accessible for routing a reply to the anonymous feedback to the user but never accessible to one or more other users;
- providing one or more specialized user interfaces to the one or more other users for submitting the reply to the anonymous feedback, the one or more specialized user interfaces including automatically assigning a responsibility for the submitting of the reply to the one or more users based on a role of the one or more users; and
- performing the routing of the reply to the anonymous feedback to the user based on an accessing of the identifying information and notifying the user of the submitting of the reply to the anonymous feedback by the one or more other users for managing via one or more additional specialized user interfaces.

16. The non-transitory computer-readable storage medium of claim 15, the operations further comprising determining to continue a conversation between the user and the one or more other users based on a determination that the user has submitted additional anonymous feedback via the one or more additional specialized user interfaces.

17. The non-transitory computer-readable storage medium of claim 15, the operations further comprising determining to close a feedback loop associated with the anonymous feedback based on a determination that the user has requested the closing of the feedback loop via the one or more additional specialized user interfaces.

18. The non-transitory computer-readable storage medium of claim 15, wherein each of the one or more other users have at least one of an administrator, a manager, or a manager of managers (MOM) role.

19. The non-transitory computer-readable storage medium of claim 18, wherein the one or more specialized user interfaces are configured to present the anonymous feedback to each of the one or more users having the administrator role, but keep the anonymous feedback hidden from the one or more users having a manager or MOM role.

20. The non-transitory computer-readable storage medium of claim 15, wherein the one or more specialized user interfaces include options for managing a reply to the user.

* * * * *